(12) United States Patent
Tsao et al.

(10) Patent No.: US 10,073,633 B2
(45) Date of Patent: Sep. 11, 2018

(54) DATA STORAGE SYSTEM AND METHOD FOR A PLURALITY OF DISK ARRAYS

(71) Applicant: ACCELSTOR, INC., Taipei (TW)

(72) Inventors: Shih-Chiang Tsao, Taipei (TW); Ting-Fang Chien, Taipei (TW); An-Nan Chang, Taipei (TW)

(73) Assignee: Accelstor Ltd., Grand Cayman (KY)

( * ) Notice: Subject to any disclaimer, the term of this patent is extended or adjusted under 35 U.S.C. 154(b) by 0 days.

(21) Appl. No.: 15/096,620

(22) Filed: Apr. 12, 2016

(65) Prior Publication Data

US 2017/0115905 A1    Apr. 27, 2017

(30) Foreign Application Priority Data

Oct. 22, 2015 (TW) .............................. 104134693 A (51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 11/20* | (2006.01) |
| *G06F 11/10* | (2006.01) |

(52) U.S. Cl.
CPC ............ *G06F 3/0617* (2013.01); *G06F 3/064* (2013.01); *G06F 3/0629* (2013.01); *G06F 3/0689* (2013.01); *G06F 11/2094* (2013.01); *G06F 3/0619* (2013.01); *G06F 11/1092* (2013.01); *G06F 2211/1004* (2013.01); *G06F 2211/1083* (2013.01)

(58) Field of Classification Search
CPC .... G06F 3/0619; G06F 3/0617; G06F 3/0629; G06F 3/064; G06F 3/0689; G06F 11/1076; G06F 11/1092; G06F 2211/1004; G06F 2211/1083; G06F 11/2094
USPC ................................................... 711/114, 103
See application file for complete search history.

(56) References Cited

U.S. PATENT DOCUMENTS

| | | | | |
|---|---|---|---|---|
| 2002/0194526 | A1* | 12/2002 | Ulrich | ..................... G06F 3/061 714/6.12 |
| 2006/0277347 | A1* | 12/2006 | Ashmore | .............. G06F 3/0611 710/313 |
| 2007/0233931 | A1* | 10/2007 | Tanaka | ................ G06F 12/0246 711/5 |
| 2015/0269043 | A1* | 9/2015 | Wilson | ................ G06F 11/3006 714/6.3 |

(Continued)

*Primary Examiner* — Shane Woolwine
(74) *Attorney, Agent, or Firm* — Rosenberg, Klein & Lee (57) ABSTRACT

The present invention provides a data storage system and method. A controller is connected to a plurality of disk arrays, and each disk array is provided with a data protection unit for data protection. When one disk drive of one of the disk arrays is damaged, this disk array is defined as a damaged disk array, while other disk arrays without disk drives being damaged are defined as at least one normal disk array. The controller stops to write a new written data into the damaged disk array, while write the new written data into the normal disk arrays. The new written data will be protected by the data protection units of the normal disk arrays. Thereby, continuous data protection for the new written data by the data protection units together with preservation of storage performance of the system, after the disk drive is damaged, may be achieved.

10 Claims, 8 Drawing Sheets

(56) References Cited

U.S. PATENT DOCUMENTS

2016/0203055 A1\* 7/2016 Dain ................... G06F 11/1453
714/6.24
2016/0378339 A1\* 12/2016 Andre ..................... G06F 3/061
711/114

\* cited by examiner

DATA STORAGE SYSTEM AND METHOD FOR A PLURALITY OF DISK ARRAYS

CROSS-REFERENCE TO RELATED APPLICATIONS

This non-provisional application claims priority claim under 35 U.S.C. § 119(a) on Taiwan Patent Application No. 104134693 filed Oct. 22, 2015, the entire contents of which are incorporated herein by reference.

FIELD OF THE INVENTION

The present invention is related to a data storage system and method, particularly to a data storage system and method, applied to a disk array, providing unceasing protection to desirable written data.

BACKGROUND

In conventional data storage systems, it is general to use redundant array of independent disks (RAID) for data protection. A disk array is constituted by a plurality of disk drives to form an array of disk drives, in such a way that the object of enhanced data integrity, enhanced fault tolerance, increased data processing capacity or memory capacity may be achieved. The RAID is divided into a variety of disk array configurations, such as common disk array configurations including RAID-0, RAID-1, RAID-5, RAID-6, RAID-10, RAID-50, RAID-60 and etc., each having advantages and disadvantages in theory. It is intended for various disk array configurations to balance between two objects of increased reliability and increased access performance.

Figure 1:
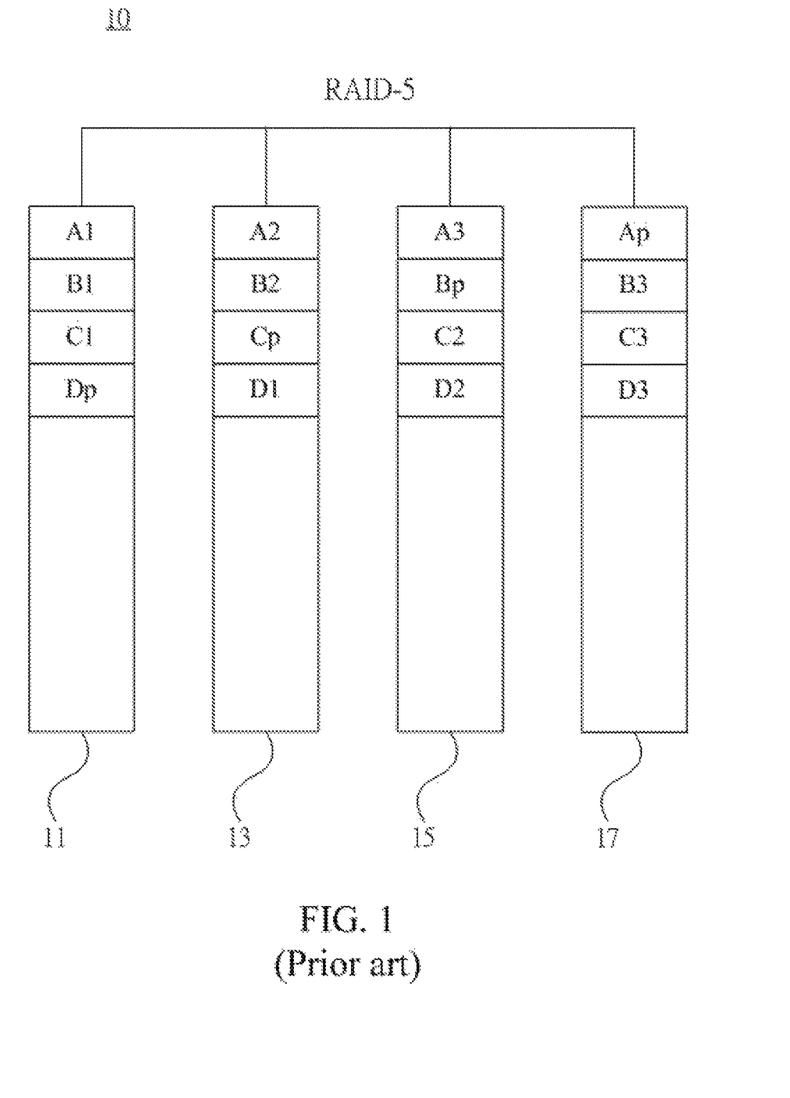
FIG. 1 is a structural diagram of a conventional data storage system.

As illustrated in FIG. 1, there is shown a structural diagram of a conventional data storage system. The data storage system 10 is a disk array system in RAID-5 configuration, provided with four disk drives 11, 13, 15 and 17, in which a data protection unit (or referred to as data protection mechanism) is provided for inserting parity between data, while writing desirable written data to the disk drives 11-17 in a distributed manner (in groups) in chief. When one of the disk drives (such as, the disk drive 17) is failed or damaged, only the parity inserted at leading end and trailing end of this sector previously is utilized for calculating and restoring contents stored in the failed disk drive 17 after the failed disk drive 17 is replaced. Thereby, the object of data protection is achieved.

For instance, data A may be grouped into data A1, data A2, data A3 and parity Ap corresponding to data A, and then, A1, A2, A3 and Ap are written into the disk drives 11, 13, 15 and 17, respectively. Data B may be grouped into data B1, data B2, data B3 and parity Bp corresponding to data B, and then, B1, B2, Bp and B3 are written into the disk drives 11, 13, 15 and 17, respectively. Data C may be grouped into data C1, data C2, data C3 and parity Cp corresponding to data C, and then, C1, Cp, C2 and C3 are written into the disk drives 11, 13, 15 and 17, respectively. Data D may be grouped into data D1, data D2, data D3 and parity Dp corresponding to data D, and then, Dp, D1, D2 and D3 are written into the disk drives 11, 13, 15 and 17, respectively. When one of the disk drives, such as disk drive 17, of the data storage system 10 is failed, only replacing the failed disk drive 17, followed by utilizing the parity Ap, Bp, Cp and Dp inserted at leading end and trailing end of this sector previously, is required for calculating and restoring contents in the failed disk drive 17. Further, the object of data protection is achieved.

The advantage of RAID-5 disk array configuration is high speed with capability of restoring data by calculation, in case that any one disk drive is failed, after the failed disk drive is replaced. For the duration of failure of any one disk, however, no data protection to new written data is performed in RAID-5 configuration, until the failed disk drive is replaced with a new one.

Figure 2:
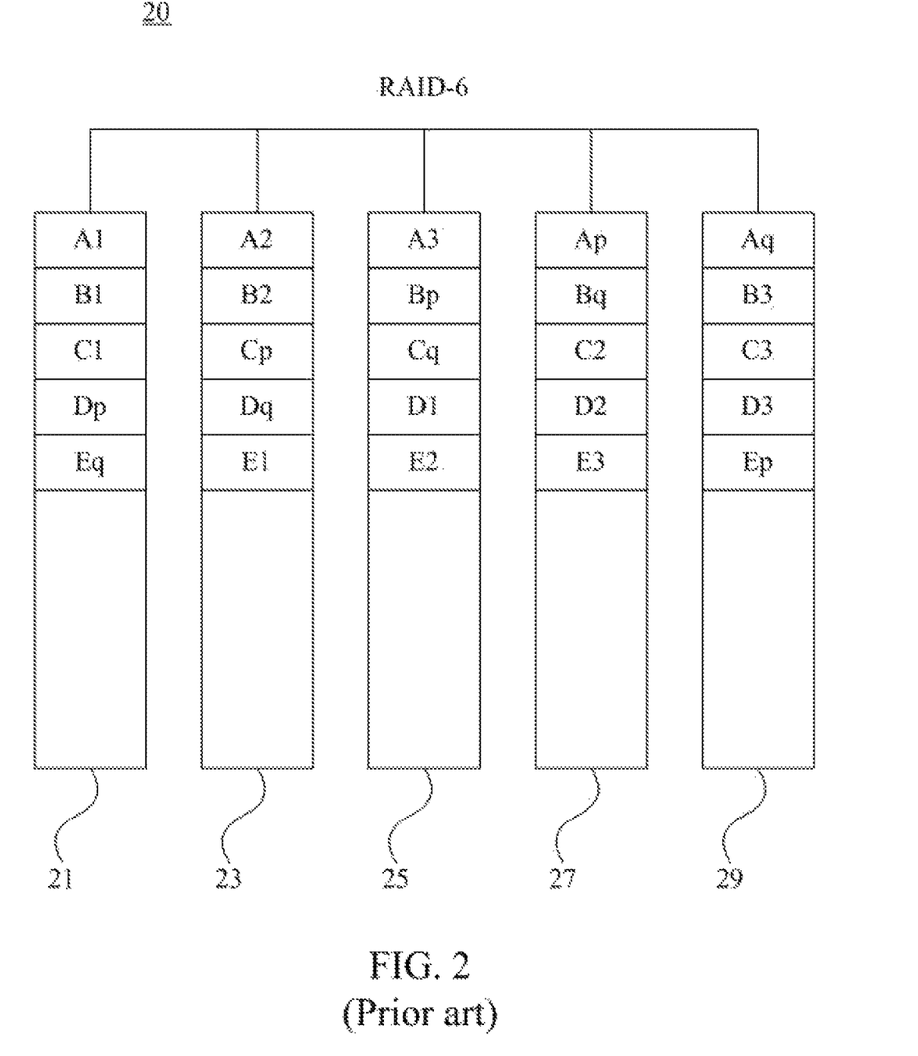
FIG. 2 is a structural diagram of another conventional data storage system.

As illustrated in FIG. 2, there is shown a structural diagram of another conventional data storage system. The data storage system 20 is a disk array system in RAID-6 configuration, provided with five disk drives 21, 23, 25, 27 and 29, in which a data protection unit (or referred to as data protection mechanism) is provided for inserting parity between data, while writing data to the disk drives in a distributed manner or in groups. When one disk drive, such as the disk drive 23, for example, is failed, only the parity inserted at leading end and trailing end of this sector previously is utilized for calculating contents of the failed disk drive 23 after the failed disk drive 23 is replaced. Thereby, the object of data protection is further achieved.

Compared to the conventional data storage system (RAID-5) illustrated in FIG. 1, the RAID-6 configuration is additionally provided with a second independent parity block. Different algorithms are used by these two independent parities, respectively, so as to obtain high reliability of data. Data integrity may not be impacted, even though any two disk drives fail at the same time. Nevertheless, system performance is reduced due to complex and massive calculation.

Data A illustrated in FIG. 2 may be grouped into data A1, data A2, data A3, and two independent parities Ap and Aq corresponding to data A, and then, A1, A2, A3, Ap and Aq are written into the disk drives 21, 23, 25, 27 and 29, respectively. Data B may be grouped into data B1, data B2, data B3, and two independent parities Bp and Bq corresponding to data B, and then, B1, B2, Bp, Bq and B3 are written into the disk drives 21, 23, 25, 27 and 29, respectively. Data C may be grouped into data C1, data C2, data C3, and two independent parities Cp and Cq corresponding to data C, and then, C1, Cp, Cq, C2 and C3 are written into the disk drives 21, 23, 25, 27 and 29, respectively. Data D may be grouped into data D1, data D2, data D3, and two independent parities Dp and Dq corresponding to data D, and then, Dp, Dq, D1, D2 and D3 are written into the disk drives 21, 23, 25, 27 and 29, respectively. Data E may be grouped into data E1, data E2, data E3, and two independent parities Ep and Eq corresponding to data E, and then, Eq, E1, E2, E3 and Ep are written into the disk drives 21, 23, 25, 27 and 29, respectively. Furthermore, when any one or two disk drives of the data storage system 20 are failed, only replacing the failed disk drives, followed by utilizing the parities Ap, Bp, Cp, Dp, Ep, Aq, Bq, Cq, Dq and Eq inserted at leading end and trailing end of this sector previously, is required for calculating contents in the failed disk drive, so as to achieve the object of data protection.

In RAID-6 configuration, however, larger disk space allocated for parity and additional check calculation is necessary, which results in larger amount of operation and amount of calculation in comparison with RAID-5 configuration. Thereby, writing performance is poor in RAID-6 configuration. Furthermore, although data protection to new written data is performed in RAID-6 configuration after one or more disk drives are damaged until the replacement of damaged disk drives with new ones, longer elapsed time for calculation is needed for data protection mechanism (or referred to as data protection unit) in comparison with that needed for other mechanisms. Moreover, no data protection to data, written newly after the disk drives are damaged, is obtained either before the damaged disk drives are not replaced.

SUMMARY

It is the primary object of the present invention to provide a data storage system, capable of performing data protection for a new written data unceasingly, in case that a disk drive is damaged, until the damaged disk drive is recovered or replaced. Thereby, the function of data protection for the new written data is enhanced.

It is the secondary objection of the present invention to provide a data storage method, capable of performing data protection for a new written data unceasingly, in case that one disk array is damaged, by means of a data protection unit of the other normal disk array, until the damaged disk array is recovered or replaced. Thereby, not only the function of data protection for the new written data is enhanced, but also storage performance of the system is maintained.

For achieving above objects, the present invention provides a data storage system, comprising: a plurality of disk arrays, each disk array being constituted by a plurality of disk drives and having a corresponding data protection unit; and a controller, connected to the disk arrays and a data mapping table, the controller being allowed to create an index data for physical storage locations in the disk arrays and store the index data into the data mapping table, the controller performing data access to the disk arrays on the basis of the index data in the data mapping table, in case of one disk drive of one of the disk arrays being damaged, the disk array being marked as a damaged disk array by the controller, while the other disk arrays without damaged disk drives being marked as at least one normal disk array by the controller, the controller further stopping writing a new written data into the damaged disk array, while writing the new written data into the normal disk arrays, the new written data being protected by the data protection units of the normal disk arrays.

In one embodiment of the present invention, wherein the disk arrays are disk array configurations of RAID-1, RAID-5, RAID-6, RAID-10, RAID-50 or RAID-60.

In one embodiment of the present invention, wherein the disk arrays are constituted in different disk array configurations, respectively.

In one embodiment of the present invention, wherein the controller is allowed to group a desirable written data firstly, and then write each group of data into a corresponding disk array, the controller further creating the index data on the basis of grouped data of the desirable written data.

In one embodiment of the present invention, wherein each of disk arrays is provided with a reserved storage block, the new written data being written into the reserved storage block of the normal disk array in case of one of the disk arrays being the damaged disk array.

The present invention also provides another a data storage method, comprising the steps as follows: creating an index data for physical storage locations in a plurality of disk arrays by a controller, each disk array having a corresponding data protection unit; storing the index data into a data mapping table by the controller; performing data access to the disk arrays by the controller on the basis of the index data in the data mapping table; marking one disk drive, which is damaged, of one of the disk arrays as a damaged disk array, while marking the other disk arrays without disk drives being damaged as at least one normal disk array, the controller stopping writing a new written data into the damaged disk array; and writing the new written data into the normal disk arrays by the controller, the new written data being protected by the data protection units of the normal disk arrays.

In one embodiment of the present invention, further comprising the step as follows: controlling and causing an electronic device connected to the controller not to read a subsequent logical data address of the damaged disk array by the controller.

The present invention also provides another a data storage method, comprising the steps as follows: connecting a controller to a plurality of disk arrays, each disk array having a corresponding data protection unit; grouping a desirable written data into a plurality of groups of data, and then writing each group of data into different disk arrays, respectively, by the controller, the controller storing contents of relation between logical data addresses and physical storage locations of the grouped data into a data mapping table; and marking one disk drive, which is damaged, of one of the disk arrays as a damaged disk array, while marking the other disk arrays without disk drives being damaged as at least one normal disk array, the controller stopping writing grouped data of a new written data into the damaged disk array, while writing the grouped data of the new written data into the normal disk arrays by the controller on the basis of the grouped data in the data mapping table, the new written data being protected by the data protection units of the normal disk arrays.

In one embodiment of the present invention, further comprising the step as follows: writing a part of the grouped data into a reserved storage block of the normal disk array by the controller on the basis of the grouped data in the data mapping table.

In one embodiment of the present invention, further comprising the step as follows: adding a substitute storage location to contents of relation between logical data addresses and physical storage locations of the grouped data by the controller when the damaged disk array occurs.

DETAILED DESCRIPTION OF THE PREFERRED EMBODIMENTS

The invention will be apparent from the following embodiments, such that it would be embodied by those skilled in the art accordingly. The following embodiments are not, however, to be regarded as being restrictive on the invention. In this case, the same numerals are always used to indicate identical components.

Figure 3:
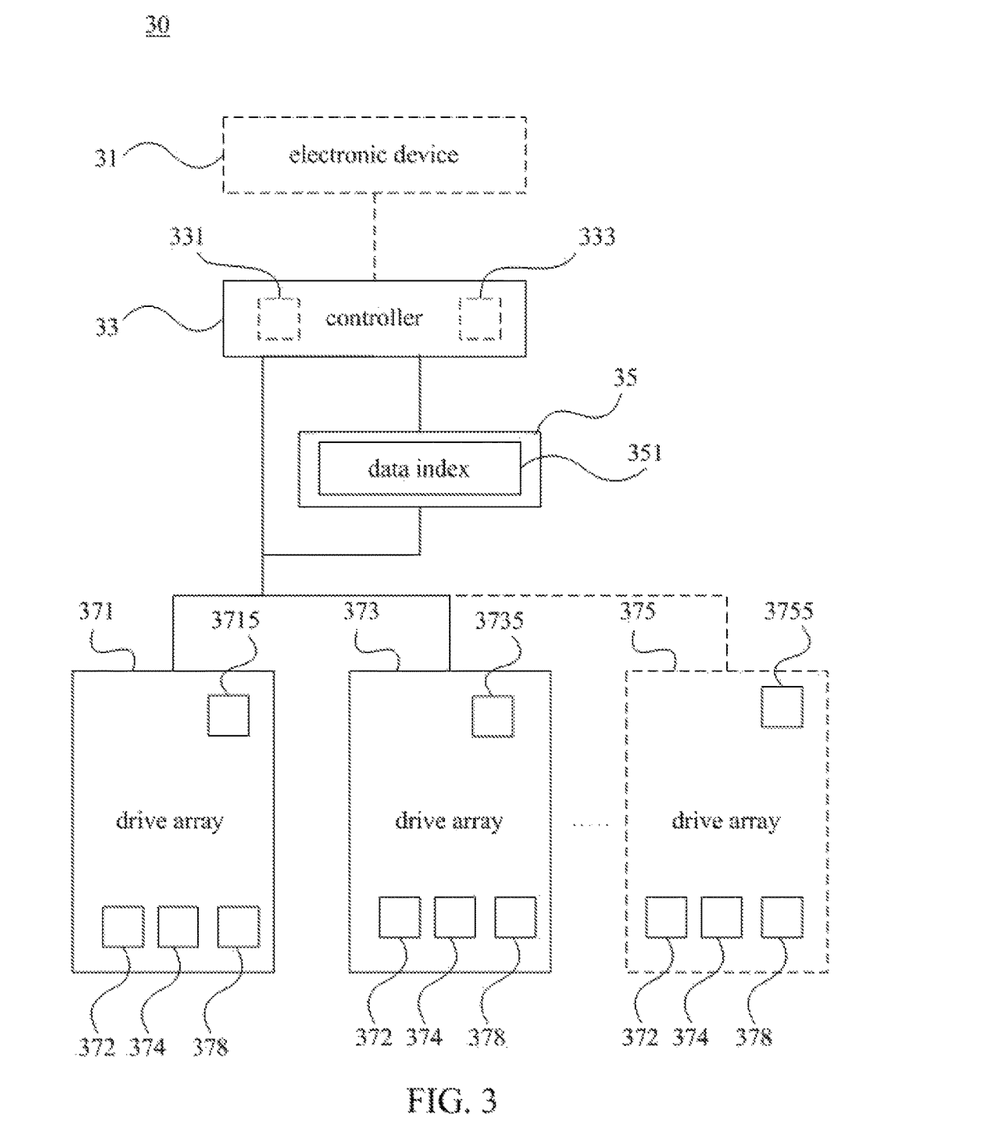
FIG. 3 is a structural diagram of a data storage system according to one embodiment of the present invention.

Referring to FIG. 3, there is shown a structural diagram of a data storage system according to one embodiment of the present invention. As illustrated in this figure, the data storage system 30 comprises a controller 33, a data mapping table 35 and a plurality of disk arrays 371, 373 and 375. The controller 33 may be electrically connected to an external electronic device 31.

In this case, the disk arrays 371, 373 and 375 are constituted by a plurality of disk drives 372, 374 . . . 378, respectively. Each disk array 371, 373, 375 is provided with individual data protection mechanism (or referred to as data protection unit) 3715, 3735, 3755 so as to protect the written data. Besides, the disk arrays 371, 373 and 375 are disk array configurations of RAID-1, RAID-5, RAID-6, RAID-10, RAID-50 or RAID-60, but not limited thereto. The data protection unit 3715, 3735, 3755 is conforming to protocol specification of RAID-1, RAID-5, RAID-6, RAID-10, RAID-50 or RAID-60. The controller 33 may be connected to the data mapping table 35, and the disk arrays 371, 373 and 375, respectively. An index data 351 is created for data storage locations, physical storage locations of physical storage blocks, and/or physical storage locations of the written data in the disk arrays 371, 373 and 375, and then, the index data 351 is stored into the data mapping table 35 by the controller 33. The controller 33 is allowed for data access to the disk arrays 371, 373 and 375 on the basis of the index data 351 of the data mapping table 35.

When each disk drive 372, 374, 378 of all the disk arrays 371, 373 and 375 is normal, the controller 33 is allowed to allocate a desirable written data 331 to the physical storage block (or referred to as physical storage location) in one of the disk drives 372, 374 and 378 of any one disk array 371, 373, 375 in any manner, and write data, including logical data address and physical storage location, of the written data into the index data 351. When one disk drive (such as, the disk drive 374) of one of the disk arrays (such as, the disk array 371) is damaged, this disk array 371 is defined as a damaged disk array by the controller 33, while the other disk arrays 373, 375 without damaged disk drives are defined as at least one normal disk array by the controller 33. Further, the controller 33 is allowed to control and stop writing a new written data 333 into that disk array 371 having the damaged disk drive 374, while write the new written data 333 into the physical storage location in the normal disk arrays 373, 375. The new written data 333 is still protected by the normal disk arrays 373, 375 in normal operation on the basis of the data protection units 3735, 3755 of the disk arrays themselves. Moreover, data having been stored in the damaged disk array 371 may be still read out, only the new written data 333 is no longer stored therein. Thereby, the object of continuous data protection for the new written data 333 together with preservation of storage performance of the system, after the disk drive 374 of the disk array 371 is damaged, may be then achieved.

In one embodiment of the present invention, the disk arrays 371, 373 and 375 may be constituted in a disk array configuration of the same protocol, such as, the disk arrays 371, 373 and 375 are all constituted in RAID-5 configuration, for example. Otherwise, the disk arrays 371, 373 and 375 are constituted in disk array configurations of different protocols, such as, the disk array 371 is constituted in RAID-5 configuration, the disk array 373 is constituted in RAID-6 configuration, and the disk array 375 is constituted in RAID-10 configuration.

In this case, the electronic device 31 may be a computer, portable computer, or smart phone, but not limited thereto. The electronic device 31 may be connected to the controlled 33 in a wired or wireless manner. The electronic device 31 may be operated by a user for data access to disk arrays 371, 373 and 375.

Figure 4:
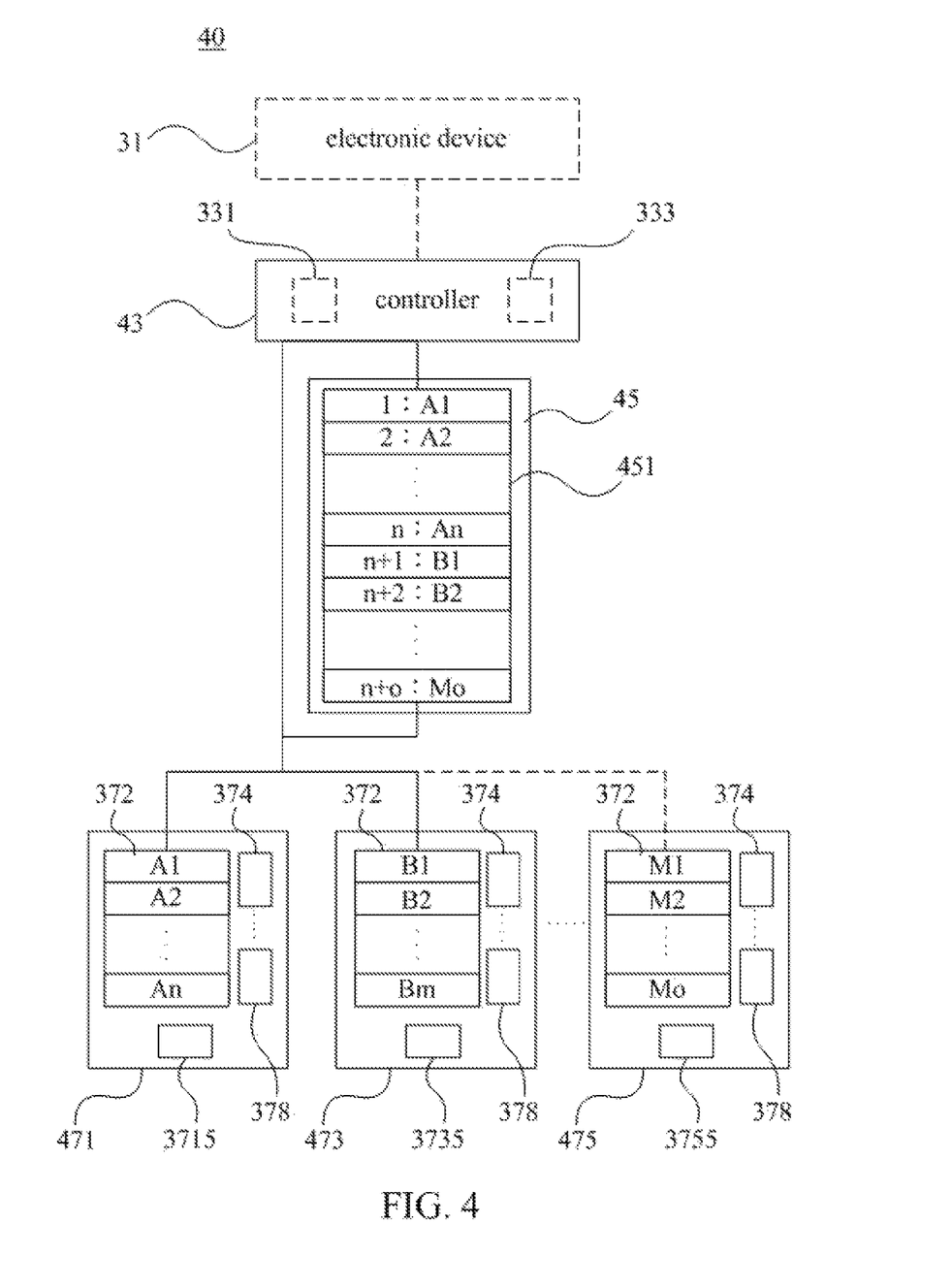
FIG. 4 is a structural diagram of a data storage system according to a further embodiment of the present invention.

Referring to FIG. 4, there is shown a structural diagram of a data storage system according to a further embodiment of the present invention. As illustrated in this figure, the data storage system 40 comprises a controller 43, a data mapping table 45 and disk arrays 471, 473 and 475.

In this case, the disk arrays 471, 473 and 475 are constituted by a plurality of disk drives 372, 374 and 378, respectively. Each of disk arrays 471, 473, 475 is provided with individual data protection unit 3715, 3735, 3755 so as to protect the written data. Besides, the disk arrays 471, 473 and 475 are disk array configurations of RAID-1, RAID-5, RAID-6, RAID-10, RAID-50, RAID-60 and etc., but not limited thereto. The data protection unit 3715, 3735, 3755 is conforming to protocol specification of RAID-1, RAID-5, RAID-6, RAID-10, RAID-50 or RAID-60. The controller 43 may be connected to the data mapping table 45, and the disk arrays 471, 473 and 475, respectively. An index data 451 is created for physical storage locations in the disk arrays 471, 473 and 475 by the controller 43. In this case, the disk array 471 is provided with physical storage locations A1, A2 . . . An, the disk array 473 is provided with physical storage locations B1, B2 . . . Bm, and the disk array 475 is provided with physical storage locations M1, M2 . . . Mo. The physical storage locations A1, A2 . . . An, B1, B2 . . . Bm and M1, M2 . . . Mo are assigned with corresponding numbers of logical data address, such as, 1:A1, 2:A2 . . . n:An, n+1:B1, n+2:B2 . . . n+m:Bm, in turn by the controlled 43. The expression of "1:A1" represents the logical digital address numbered 1, to which the electronic device 31 accesses desirably, with corresponding actual physical storage location situated at A1 of the disk array 471. The expression of "n+1:B1" represents the digital data address n+1, to which the electronic device accesses desirably, with corresponding actual physical storage location situated at B1 of the disk array 473. An index data 451 is created, and then stored into the data mapping table 45 by the controlled 43. In the index data 451, the relation contents between the logical data address and the physical storage location of the stored data is recorded.

When each disk drive of all the disk arrays 471, 473 and 475 is normal, the controller 43 is allowed to allocate the desirable written data 331 to one of the physical storage locations in one of the disk drivers 372, 374 and 378 of any one disk array 471, 473, 475 in any manner. The electronic device 31 and/or the controller 43 is able to perform data access to the storage locations A1, A2 . . . An, B1, B2 . . . Bm and M1, M2 . . . Mo in the disk arrays 471, 473 and 475 on the basis of the index data 451 (1:A1, 2:A2 . . . n:An, n+1:B1, n+2:B2 . . . n+m:Bm) in the data mapping table 45.

When one of the disk drives of one disk array is damaged, such as the disk drive 372 of the disk array 471, the disk array 471 is marked and defined as a damaged disk array, while the other disk arrays 473, 475 operated in normally are marked and defined as at least one normal disk array by the controller 43. The controller 43 is allowed to stop writing the new written data 333 into that disk array 471 having the damaged disk drive, while write the new written data 333 into the physical storage location in the other normal disk arrays 473, 475. Furthermore, the new written data 333 written after disk array 471 being damaged is still protected by the disk arrays 473, 475 on the basis of the data protection units 3735, 3755 of the disk arrays themselves.

Under the control of the controller 43 of the present invention, the logical data address (also referred to as subsequent logical data address), to which the physical storage location without being written yet in the damaged disk array 471 corresponds, may not be read by the electronic device 31. It is then to avoid storing the new written data 333 into the damaged disk array 471. Instead, the new written data 333 may be stored in the normal disk arrays 473, 475, and protected by the disk arrays 473, 475. Moreover, the desirable written data 331 having been stored in the disk array 471 before damage may be still read out. Thereby, the object of continuous protection for the new written data 333 together with preservation of storage performance of the system, after the disk drive 374 is damaged, may be then achieved.

Figure 5:
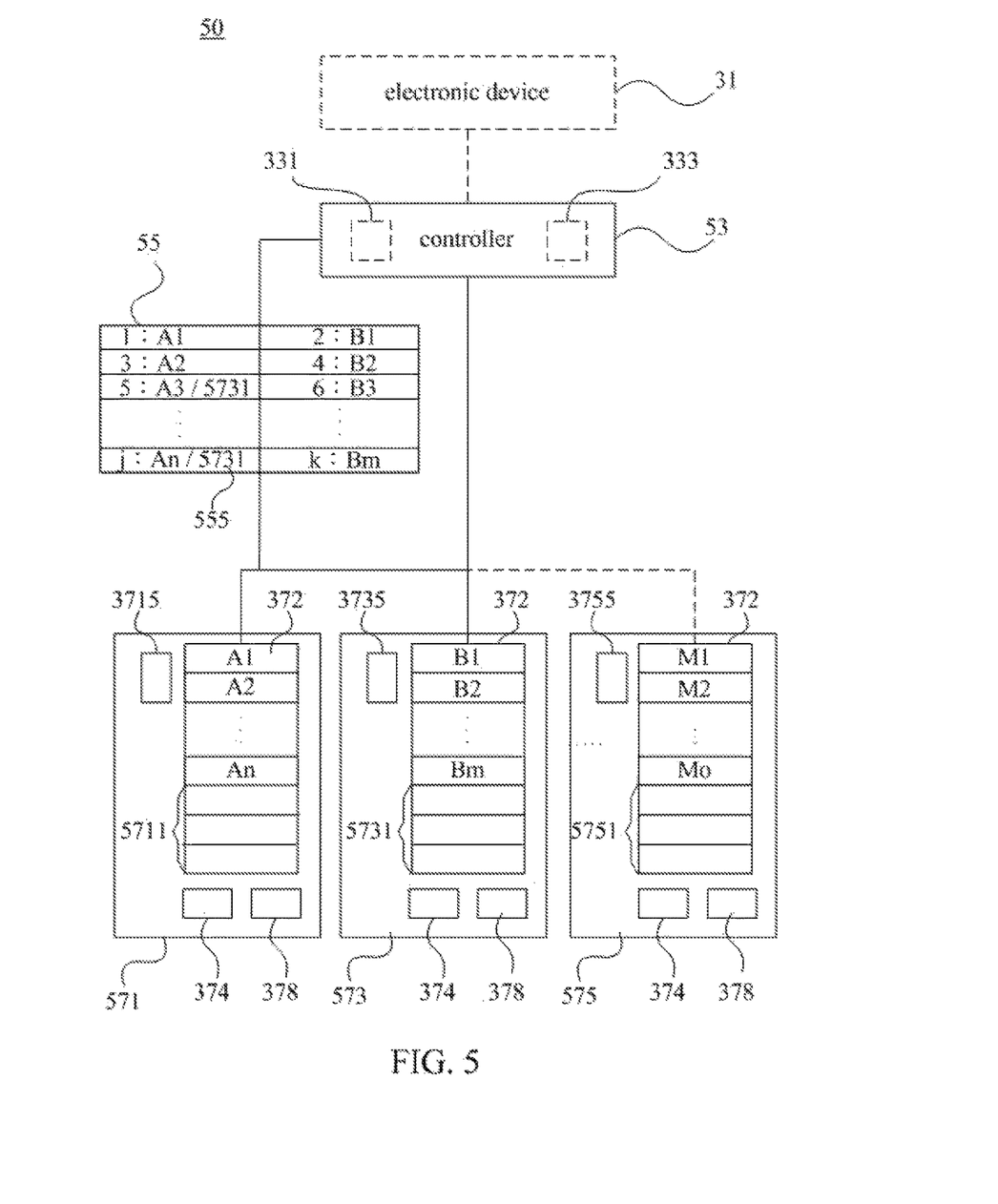
FIG. 5 is a structural diagram of a data storage system according to a further embodiment of the present invention.

Referring to FIG. 5, there is shown a structural diagram of a data storage system according to a further embodiment of the present invention. As illustrated in this figure, the data storage system 50 comprises a controller 53, a data mapping table 55, and disk arrays 571, 573 and 575.

In this case, the disk arrays 571, 573 and 575 are constituted by a plurality of disk drives 372, 374 and 378, respectively. Each disk array 571, 573 and 575 is provided with data protection mechanism (such as data protection unit) 3715, 3735, 3755, for data protection, of its own protocol. Besides, the disk arrays 571, 573 and 575 are disk array configurations of RAID-1, RAID-5, RAID-6, RAID-10, RAID-50, RAID-60 and etc., but not limited thereto. The data protection unit 3715, 3735, 3755 is conforming to protocol specification of RAID-1, RAID-5, RAID-6, RAID-10, RAID-50 or RAID-60. The controller 53 may be connected to the data mapping table 55, and the disk arrays 571, 573 and 575, respectively. The controller 53 is allowed for data access to the disk arrays 571, 573 and 575. In this connection, the controller 53 is allowed to group a desirable written data 331 firstly. For instance, the desirable written data 331 is allocated or grouped into odd group, "1:A1, 3:A2, 5:A3 . . . j:An", and even group, "2:B1, 4:B2, 6:B3 . . . k:Bm", in which, the expression of "1:A1" represents allocation of the desirable written data (A1) 331 to the odd group with logical data address numbered 1, and physical storage location situated at A1. The expression of "2:B1" represents allocation of the desirable written data (B1) 331 to the even group with logical data address numbered 2, and physical storage location situated at B1. Subsequently, the controller 53 is then allowed to write each group of written data 331 into individual disk array 571, 573, respectively. For instance, data (A1, A2, A3 . . . An) in the odd group of "1:A1, 3:A2, 5:A3 . . . j:An" may be written into the disk array 571, while data (B1, B2, B3 . . . Bm) in the even group of "2:B1, 4:B2, 6:B3 . . . k:Bm" may be written into the disk array 573. Moreover, the controller 53 is also allowed to store the grouped data of "1:A1, 3:A2, 5:A3 . . . J:An" and "2:B1, 4:B2, 6:B3 . . . k:Bm" into the data mapping table 55 and/or index data.

When one disk drive of one of the disk arrays is damaged, such as the disk drive 372 of the disk array 571, the disk array 571 is marked and defined as a damaged disk array, while the other disk arrays 573, 575 without damaged disk drives are marked and defined as at least one normal disk array by the controller 53. The controller 53 is allowed to stop writing the next new written data 333 into the damaged disk array 571 on the basis of the grouped data in the data mapping table 55 and/or index data, while write the new written data 333 into the physical storage location in the normal disk arrays 573, 575 on the basis of the data mapping table 55 so that the new written data 333 is still protected on the basis of the data protection units 3735, 3755 of the disk arrays 573, 575. Moreover, the desirable written data 331 having been stored in the disk array 571 before damage may be still read out. Thereby, the object of continuous data protection for the new written data 333 together with preservation of storage performance of the system, after the disk drive 372 is damaged, may be then achieved.

In a further embodiment of the present invention, the disk arrays 571, 573 and 575 are provided with reserved storage blocks 5711, 5731 and 5751, respectively. These reserved storage blocks 5711, 5731 and 5751 are used for storing the new written data 333, which should be written into the damaged disk array 571 having the damaged disk drive 372 originally. For instance, when the damage of disk drive takes place in the disk array 571, the controller 53 may arrange data (A3 . . . An) in the odd group of "5:A3 . . . j:An", which should be written in the damaged disk 571 originally, to be written into the reserved storage block 5731 of the disk array 573. The occupancy of all the available space of the disk array 573 by data (B1, B2, B3 . . . Bm) of the even group of "2:B1, 4:B2, 6:B3 . . . k:Bm", which should be written into the disk array 573, such that no storage space of the disk array 573 is available for the new written data (A3 . . . An) in the odd group of "5:A3 . . . j:An", may be avoided by the provision of the reserved storage block 5731, if the damage of disk drive takes place in the disk array 571.

In a further embodiment of the present invention, when one disk drive of one of the disk arrays is damaged, such as the disk drive 372 of the disk array 571, the controller 53 is allowed to mark physical storage location, where the new written data 333 is stored practically, in the data mapping table 55. For instance, in case that one disk drive 372 of the disk array 571 is damaged before data is stored in the logical data address numbered 5, the physical storage locations 1 . . . j and 2 . . . k are still read by the electronic device 31. However, in a part of the data mapping table 55 with respect to "5: A3 . . . ", a mark of "5:A3/5731" (as illustrated by a slash 5731) of a substitute storage location 555 is added by the controller 53. Thus, the controller 53 is reminded that the new written data 333 desirably accessed by the electronic device 31 has been transferred to be written into the reserved storage block 5731 located in the disk array 573 according to the mark of "5:A3/5731".

In accordance with the grouped data in the data mapping table 55, writing the next new written data 333 into the damaged disk array 571 is stopped, while the new written data 333 is written into the physical storage location of the other normal disk array 573 or 575. Furthermore, the normal disk arrays 573, 575 are still protected on the basis of the data protection units 3735, 3755 of the disk arrays. Moreover, the desirable written data 331 having been stored in the damaged disk array 571 may be still read out. Thereby, the object of continuous data protection for the new written data 333 together with preservation of storage performance of the system, after the disk drive is damaged, may be then achieved.

Figure 6:
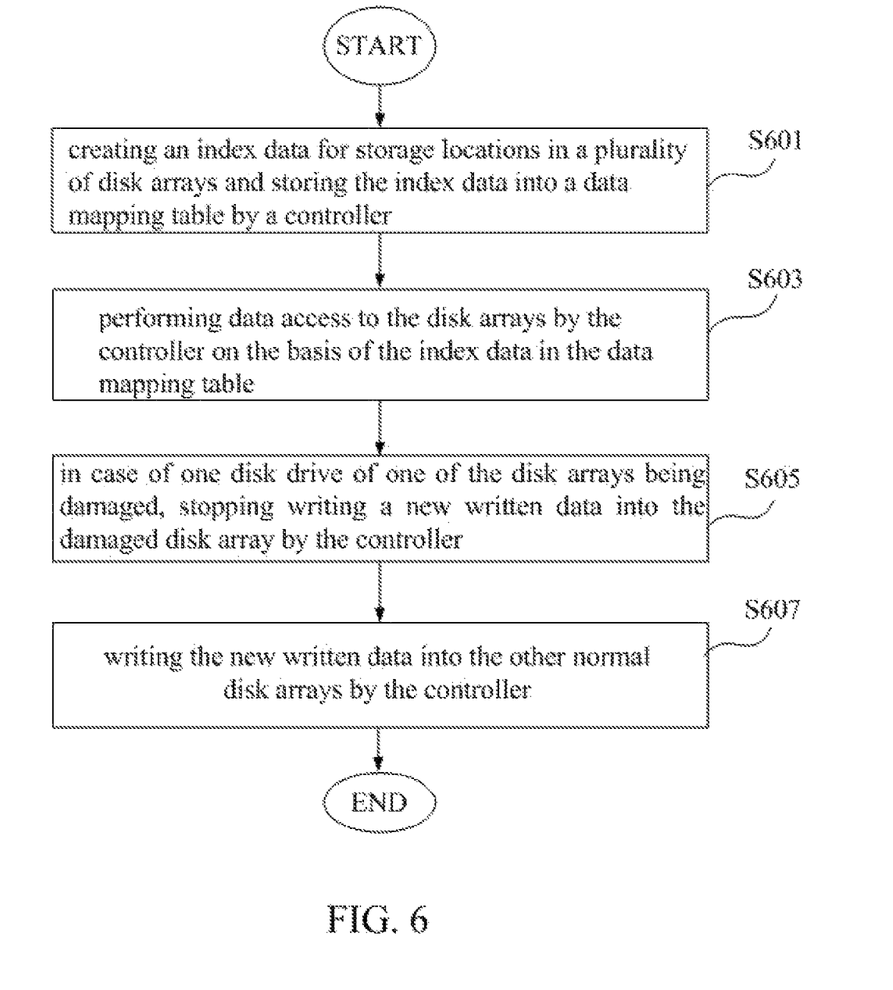
FIG. 6 is a flow chart of a data storage method according to one embodiment of the present invention.

Referring to FIG. 6 together with FIG. 4, FIG. 6 is a flow chart of a data storage method according to one embodiment of the present invention. As illustrated in this figure, in step S601, the controller 43 is allowed to create the index data 451 (1:A1, 2:A2 . . . n:An, n+1:B1, n+2:B2 . . . n+m:Bm) with respect to the storage locations in the disk arrays 471 and 473, and then store the index data 451 into the data mapping table 45. In step S603, the controller 43 is allowed for data access to the disk arrays 471, 473 and 475 on the basis of the index data 451 in the data mapping table 45. In step S605, when the disk drive of one of the disk arrays is damaged, such as the disk drive 372 of the disk array 471, the controller 43 is allowed to stop writing the new written data 333 into that the disk array 471 having the damaged disk drive. In step S607, the controller 43 is allowed to write the new written data 333 into the physical storage location in the other normal disk arrays 473, 475. Furthermore, data protection is still performed by the normal disk arrays 473, 475 on the basis of the data protection units 3735, 3755 of their disk array configurations. Furthermore, the desirable written data 331 having been stored in the disk array 471 having the damaged disk may be still read out. Thereby, the object of continuous data protection for the new written data 333 together with preservation of storage performance of the system, after the disk drive is damaged, may be then achieved.

Figure 7:
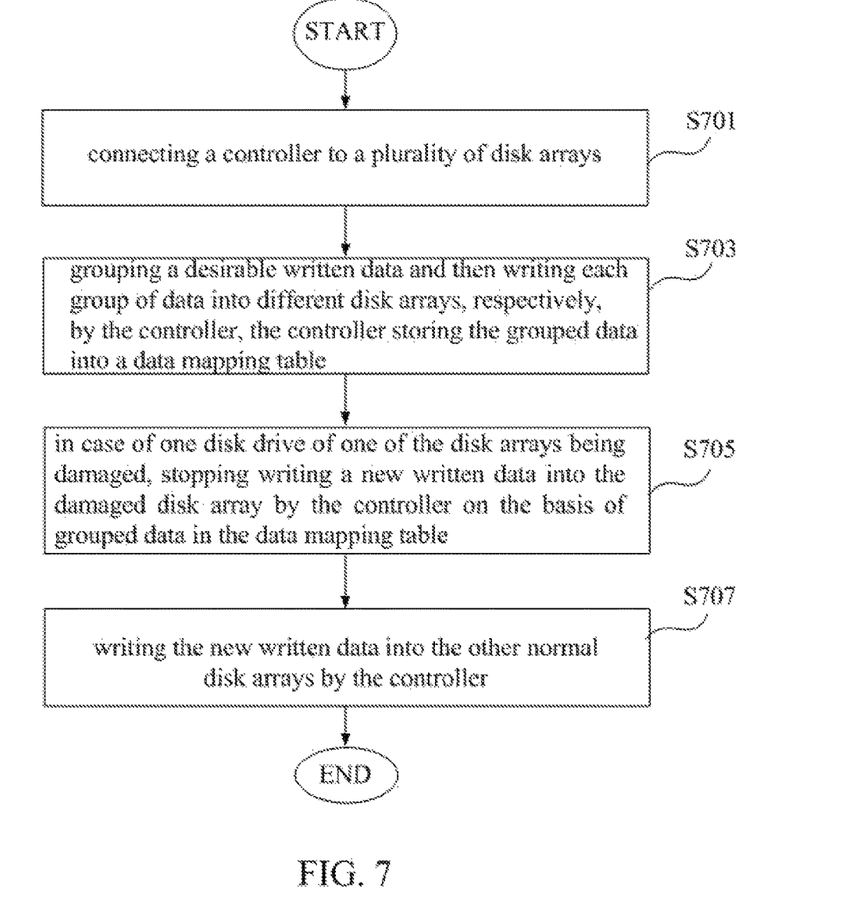
FIG. 7 is a flow chart of a data storage method according to a further embodiment of the present invention.

Referring to FIG. 7 together with FIG. 5, FIG. 7 is a flow chart of a data storage method according to another embodiment of the present invention. As illustrated in this figure, in step S701, the controller 53 is connected to the disk arrays 571, 573 and 575. In step S703, the controller 53 is allowed to group the desirable written data. For instance, the desirable written data is divided into odd group, "1:A1, 3:A2, 5:A3 . . . j:An", and even group, "2:B1, 4:B2, 6:B3 . . . k:Bm", in which, the expression of "1:A1" represents allocation of the desirable written data (A1) 331 to the odd group with logical data address numbered 1, and the expression of "2:B1" represents allocation of the desirable written data B1 (331) to the even group with logical data address numbered 2. Each group of data is then written into different disk arrays 571, 573 and 575, respectively. For instance, data (A1, A2, A3 . . . An) in the odd group of "1:A1, 3:A2, 5:A3 . . . j:An" may be written into the disk array 571, while data (B1, B2, B3 . . . Bm) in the even group of "2:B1, 4:B2, 6:B3 . . . k:Bm" may be written in the disk array 573. Moreover, the controller 53 is also allocated to store the grouped data of "1:A1, 3:A2, 5:A3 . . . J:An" and "2:B1, 4:B2, 6:B3 . . . k:Bm" into the data mapping table 55. In step S705, when the disk of one of the disk array 571 is damaged, the controller 53 is allowed to stop writing the next new written data 333 into the damaged disk array 571 on the basis of the grouped data in the data mapping table 55. In step S707, the controller 53 is allowed to write the new written data 333 into the physical storage location in the other normal disk arrays 573, 575 in normal operation on the basis of the data mapping table 55. Furthermore, data protection for the new written data 333 is still performed by the normal disk arrays 573, 575 on the basis of the data protection units 3735, 3755 of the disk array configurations of their own protocols. Furthermore, desirable written data 331 having been stored in the damaged disk array 571 may be still read out. Thereby, the object of continuous data protection for the new written data 333 together with preservation of storage performance of the system, after the disk drive is damaged, may be then achieved.

Figure 8:
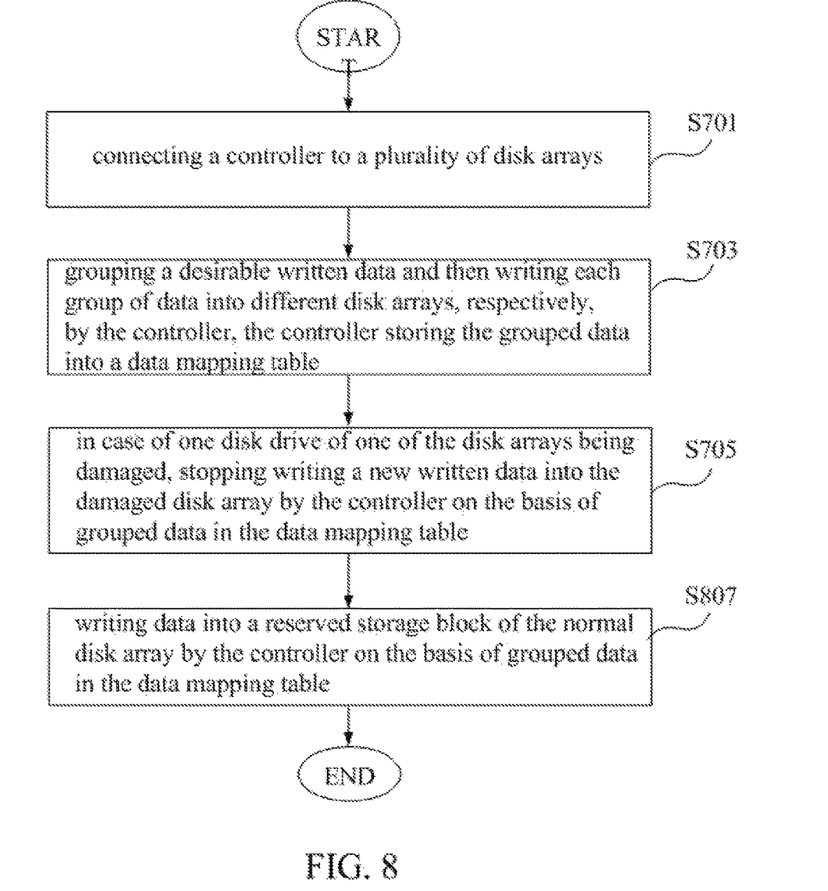
FIG. 8 is a flow chart of a data storage method according to a further embodiment of the present invention.

Referring to FIG. 8 together with FIG. 5, FIG. 8 is a flow chart of a data storage method according to a further embodiment of the present invention. As illustrated in this figure, in this figure, there is difference in comparison with the embodiment illustrated in FIG. 7 as follows. In step S807, the controller 53 is allowed to write the new written data 333 into the reserved storage blocks 5731, 5751 of the normal disk arrays 573, 575 in normal operation on the basis of the grouped data in the data mapping table 55. The problem of occupancy of all the available space of the normal disk arrays 573, 575 without unoccupied space, into which the data in the damaged disk array 571 should be written originally, may be avoided by the provision of the reserved storage blocks 5731, 5751.

This disclosure is truly an invention combining industrial application, novelty and value of industrial technology development on the basis of foregoing description. The above disclosure is, however, only the embodiments of the present invention, and not used for limiting the scope of the present invention. All equivalent variations and modifications made in accordance with claims of the present invention should be included in the scope of the present invention.

What is claimed is:

1. A data storage system, comprising:
a plurality of disk arrays, each disk array comprising a plurality of disk drives and a corresponding data protection unit; and
a controller, connected to an electronic device, said disk arrays and a data mapping table, wherein said controller is able to create an index data for physical storage locations in said disk arrays, and store said index data into said data mapping table, wherein said controller writes data into said disk arrays or reads data stored in said disk arrays on the basis of said index data in said data mapping table, wherein said controller divides said index data into a first physical storage location block and a second physical storage location block, each of said disk arrays having a plurality of respective reserve disk areas operational when at least one disk drive of a respective disk array is physically damaged defining a damaged disk array, said controller redirecting all write operations of newly written data from said damaged disk array to be written to and stored in a respective reserve disk area in another operational disk array while maintaining said damaged disk array in a read only state, thereby maintaining redundancy of the newly written data in the operational disk array during a failure of the damaged disk array.

2. The data storage system according to claim 1, wherein said disk arrays are disk array configurations of RAID-1, RAID-5, RAID-6, RAID-10, RAID-50 or RAID-60.

3. The data storage system according to claim 2, wherein said disk arrays comprise different disk array configurations, respectively.

4. The data storage system according to claim 1, wherein said controller is allowed to group a desirable written data firstly, and then write each group of data into a corresponding disk array, said controller further creating said index data on the basis of grouped data of said desirable written data.

5. A data storage method, comprising the steps as follows:
creating an index data for physical storage locations in a plurality of disk arrays by a controller, each disk array having a corresponding data protection unit;
dividing said index data into a first physical storage location block and a second physical storage location block;
storing said index data into a data mapping table by said controller;
writing data into said disk arrays or reading data stored in said disk arrays by said controller on the basis of said index data in said data mapping table;
ascertaining when at least one disk drive of a plurality of disk drives within a respective disk array is damaged and defining the associated disk array as a damaged disk array;
placing said damaged disk array in a read only mode; and
writing and storing newly written data from said controller into a reserve disk area in another operational disk array, thereby maintaining redundancy of the newly written data in the operational disk array within the reserve disk area provided in the operational disk array during a failure of the damaged disk array to permit normal read and write operations to be performed while said damaged disk array is in the read only mode.

6. The data storage method according to claim 5, further comprising the step as follows: controlling and causing an electronic device connected to said controller not to read a subsequent logical data address of said damaged disk array by said controller.

7. The data storage method according to claim 5, wherein said disk arrays are disk array configurations of RAID-1, RAID-5, RAID-6, RAID-10, RAID-50 or RAID-60.

8. A data storage method, comprising the steps as follows:

connecting a controller to a plurality of disk arrays, each disk array having a corresponding data protection unit;

grouping a desirable written data into a plurality of grouped data, and then writing each grouped data into different disk arrays, respectively, by said controller, said controller storing contents of relation between logical data addresses and physical storage locations of said grouped data into a data mapping table;

dividing said data mapping table into a first physical storage location block and a second physical storage location block, ascertaining when at least one disk drive of a plurality of disk drives within a respective disk array is damaged and defining the associated disk array as a damaged disk array;

placing said damaged disk array in a read only mode; and writing and storing newly written grouped data from said controller into a reserve disk area in another operational disk array, thereby maintaining redundancy of the newly written grouped data in the operational disk array within the reserve disk area provided in the operational disk array during a failure of the damaged disk array to permit normal read and write operations to be performed while said damaged disk array is in the read only mode.

9. The data storage method according to claim 8, further comprising the step as follows:

adding a substitute storage location to contents of relation between logical data addresses and physical storage locations of said grouped data by said controller when said damaged disk array occurs.

10. The data storage method according to claim 8, wherein said disk arrays are disk array configurations of RAID-1, RAID-5, RAID-6, RAID-10, RAID-50 or RAID-60.

* * * * *